(12) United States Patent
    Fall

(10) Patent No.: US 8,242,701 B1
(45) Date of Patent: Aug. 14, 2012

(54) LED LIGHT SOURCE ADAPTER

(76) Inventor: Kenneth G. Fall, Torrance, CA (US)

( * ) Notice: Subject to any disclaimer, the term of this patent is extended or adjusted under 35 U.S.C. 154(b) by 296 days.

(21) Appl. No.: 12/661,830

(22) Filed: Mar. 25, 2010

(51) Int. Cl.
  *H05B 37/00* (2006.01)
  *H05B 39/00* (2006.01)
  *H05B 41/00* (2006.01)
  *H01J 29/52* (2006.01)
  *G09G 1/04* (2006.01)
  *B60Q 1/26* (2006.01)
  *F21V 33/00* (2006.01)
  *F21V 29/00* (2006.01)
  *B60Q 1/06* (2006.01)
  *A01M 1/20* (2006.01)
  *A01K 71/00* (2006.01)

(52) U.S. Cl. .................. 315/185 R; 315/380; 362/227; 362/234; 362/373; 362/294; 43/107; 43/103

(58) Field of Classification Search .................. 362/249, 362/234, 373, 294; 315/32, 185 R
    See application file for complete search history.

(56) References Cited

U.S. PATENT DOCUMENTS

2008/0019130 A1*  1/2008  Wang ........................... 362/249
* cited by examiner

*Primary Examiner* — Jacob Y Choi
*Assistant Examiner* — Henry Luong
(74) *Attorney, Agent, or Firm* — Don Finkelstein

(57) ABSTRACT

An LED assembly adapted to mount in a bayonet type socket of the type having a slotted casing comprising the negative terminal and a central pin comprising the positive terminal in which a plurality of LED's are mounted on a circuit board and the LED assembly has an electrically conductive screw comprising the positive connection for engaging the central pin of the socket and an electrically conductive tube with a pin member extending outwardly therefrom for insertion in the slots of the casing of the socket for comprising the negative connection.

16 Claims, 1 Drawing Sheet

LED LIGHT SOURCE ADAPTER

BACKGROUND OF THE INVENTION

1. Field of the Invention

This invention relates to the light emitting diode art and more particularly to a structure for adapting a light emitting diode circuit board to a bayonet type socket connection.

2. Description of the Prior Art

Bayonet type electrical connections for incandescent lights are well known in the prior art. In such connections, a casing in a socket is slotted to accept a pin on the incandescent bulb assembly and is, in general, the negative terminal. A central terminal in the light socket is the positive terminal. The incandescent bulb has a central positive terminal and a negative casing having a pin that is electrically insulated from the positive terminal. The positive terminal and the negative terminal of the bulb assembly are electrically connected to the filament of the incandescent bulb to complete the circuit. Electrical power is applied to the casing of the socket and to the central terminal of the socket to cause the filament of the bulb to emit light. The light so emitted is in a broad band of electromagnetic radiation frequencies.

In many applications it is desired to utilize a light emitting diode (LED) as the source of the electromagnetic radiation in order to provide the electromagnetic radiation in a narrow band of frequencies. One such application is in the field of insect traps such as the traps utilized by the Center for Disease Control (CDC). It has been found that various species of insects respond to specific frequencies of electromagnetic radiation. The traps are generally left "OFF" during daylight hours and turned "ON" during the night from dusk to dawn. In these applications it is often desired to attract substantially only a particular species of insect so that the time consuming task of sorting out the various insects attracted by incandescent light in order to determine the number of the particular insects in the trap is minimized. By providing a source of electromagnetic radiation in only the narrow band of frequencies for the particular species it is desired to attract, the number of insects attracted by the trap that are other than the particular, targeted insect species is minimized if not eliminated. Since there are many of the CDC insect traps in use which utilize an incandescent bulb with the above described bayonet type connection, it has long been desired to provide a LED as the electromagnetic radiation emitting source but with a bayonet type electrical connection so that the LED assembly may be inserted into the existing bayonet type connector on such traps.

Accordingly, it is an object of the present invention to provide an improved LED assembly for electrical connection.

It is another object of the present invention to provide an improved LED assembly that may be inserted into an existing bayonet type electrical socket.

SUMMARY OF THE INVENTION

The above and other objects of the present invention are achieved, in a preferred embodiment thereof, by providing a circuit board on which one or more LED's are mounted. The positive circuit is located on the top of the circuit board. The negative circuit is located on the bottom of the circuit board. The circuit board has walls defining an aperture extending therethrough located in the center of the board. The positive circuit has a positive contact ring on the top of the circuit board in regions adjacent the aperture. An electrically conductive screw having a cap and a shank extends through the aperture and the underside of the cap engages the positive contact ring and the shank extends a preselected distance from the circuit board to a contact tip which makes contact with the central terminal of the bayonet type socket. A threaded electrically insulating spacer, such as a spacer made of nylon, is mounted on the shank of the screw and abuts the lower surface of the circuit board. An electrically conductive tube is mounted on the outside of the spacer and makes contact with the negative contact ring on the lower surface of the circuit board. The spacer insulates the positive terminal from the negative terminal. Electrically conductive pins extend from the outside of the electrically conductive tube and the pins engage the slots in the negative casing of the bayonet socket.

Electrical power, generally from a battery such as a six volt battery, is applied to the socket and thus to the LED assembly to cause the LED to emit the desired electromagnetic radiation. Since the LED assembly is generally only operated during the night hours, the circuit to the socket may include a switch between the battery and the socket. If desired, the switch may be controlled by a light sensitive controller that turns the switch "ON" when the intensity of the ambient light falls below a preset level and turns the switch "OFF" when the intensity of the ambient light is above a preset level. Additionally, a solar cell type energy collector may be utilized to recharge the battery during the daylight hours.

BRIEF DESCRIPTION OF THE DRAWING

The above and other embodiments of the present invention may be more fully understood from the following detailed description taken together with the accompanying drawing wherein similar reference characters refer to similar elements throughout and in which.

DESCRIPTION OF THE PREFERRED EMBODIMENTS

Figure 1:
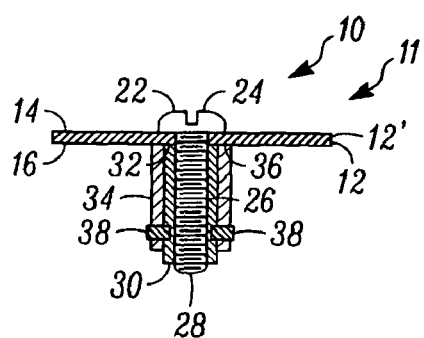
FIG. 1 is a sectional view of a LED assembly according to the principles of the present invention.

Referring now to the Figures of the drawing, there is shown in FIG. 1 a preferred embodiment 10 of an LED assembly 11 according to the principles of the present invention. There is provided a circuit board 12 having an upper surface 14 and a lower surface 16. As shown on FIG. 3, the circuit board 14 has walls 18 defining an aperture 20 extending therethrough. An electrically conductive screw 22 having a cap 24 and a shank 26 is positioned to have the shank 26 extend through the aperture 20. The cap 24 of the screw 22 contacts the upper surface 14 of the circuit board 12 and the shank 26 of the screw 22 extends through the aperture 20 a preselected distance to a tip 28.

A threaded, electrically insulating tubular spacer 30, which may be fabricated from nylon, has an inside threaded surface threadingly engages the shank 26 of the screw 22 and the upper end 32 of the spacer 30 abuts against the lower surface 16 of the circuit board 12. An electrically conductive tube 34 which may be fabricated from aluminum, surrounds the outside surface of the spacer 30 and the upper end 36 thereof abuts against the lower surface 16 of the circuit board 12. An electrically conductive pin member 38 which may be fabricated from steel, is attached to the tube 34 in regions spaced from the lower surface 16 of the circuit board 12 and extends outwardly therefrom.

Figure 3:
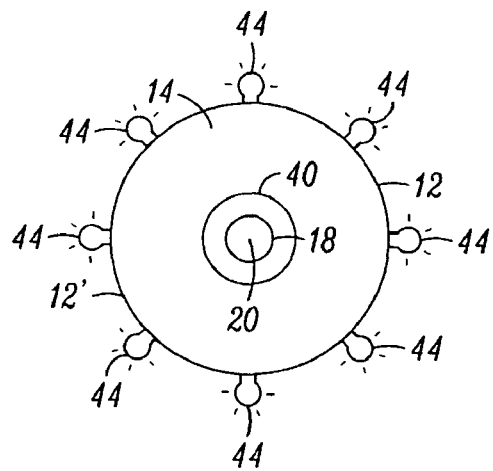
FIG. 3 is a semi schematic representation of the upper surface of a circuit board useful in the practice of the present invention; and, FIG. 4 is a semi schematic representation of the lower surface of a circuit board useful in the practice of the present invention.

FIG. 3 is a semi schematic representation of the upper surface 14 of the circuit board 12. A positive contract ring 40 is provided around the aperture 20 and the cap 24 of the screw 22 contacts the positive contact ring 40. A plurality of LED light sources 44 are mounted on the circuit board 12 in regions adjacent the periphery 12' and are appropriately electrically connected to the positive contact ring 40.

Figure 4:
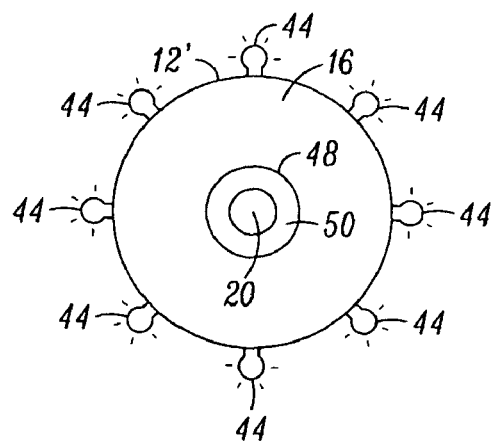

FIG. 4 is a semi schematic representation of the lower surface 16 of the circuit board 12. As shown thereon, there is a negative contact ring 48 on the lower surface 16 around the aperture 20 and the top 36 of the tube 34 contacts the negative contact ring 48. The upper end 32 of the insulating spacer 32 abuts against the lower surface 16 of the circuit board 12 in the region 50 between the negative contact ring 48 and the aperture 20. The plurality of LED light sources 44 mounted on the circuit board 12 and are appropriately electrically connected to the negative contact ring 40 to provide complete circuit continuity thereto.

The spacer 30 electrically insulates the positive circuitry from the negative circuitry.

Figure 2:
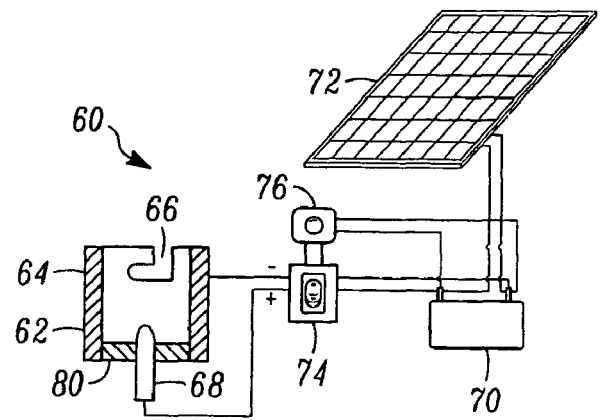
FIG. 2 is a schematic diagram of a circuit useful in the practice of the present invention.

FIG. 2 illustrates an electrical circuit generally designated 60 useful in the practice of the present invention. A conventional bayonet socket 62 is provided on, for example, the CDC insect trap presently in use in which conventional bayonet type incandescent bulbs (not shown) have heretofore been inserted. The bayonet socket 62 has an electrically conductive casing 64 in which pin accepting slots 66 are provided in diametrically opposed relationship. The casing 64 comprises the negative contact of the socket 62. A center pin 68 is provided on the socket 62 and comprises the positive contact and an electrically insulating disc 80 separates the casing 64 from the central pin 68.

A battery 70 is provided to supply electrical power to the socket 62. In many applications it may be desired to provide a solar cell 72 to charge the battery 70. A switch 74 may be provided between the battery 70 and the socket 62. The switch 74 has an "ON" position in which the electrical power is allowed to flow from the battery 70 to the socket 62 and an "OFF" position in which power is prevented from flowing to the socket 62. The switch 74 may be manually operable or it may be controlled by a light sensor 76 that turns the switch 74 to the "OFF" position for the condition of the ambient light being bright during the day light hours and turns the switch 74 "ON" during the night hours.

The LED assembly 11 is insertable into the socket 62 with the pins 38 in the pin accepting slots 66 for electrical contact with the casing 64. The tip 28 of the shank 26 of the screw 22 contacts the center pin 68 of the socket 62 to complete the electric circuit to the LED's 44.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A bayonet type LED mounting arrangement for insertion into a socket of the type having a slotted negative casing and a positive center pin comprising, in combination:
   a circuit board having an upper surface, a lower surface and a peripheral edge, said circuit board having walls defining an aperture therethrough in regions adjacent the center portion of the circuit board;
   a positive circuit on said upper surface of said circuit board and a negative circuit on said lower surface of said circuit board, said positive circuit having a positive contact ring in regions adjacent said aperture, said negative circuit having a negative contact ring in regions spaced from said aperture;
   at least one LED light source on said circuit board in regions adjacent said peripheral edge thereof, and said at least one LED light source electrically connected to said positive circuit and said negative circuit;
   an electrically conductive threaded screw member extending through said aperture in said circuit board and having a cap portion contacting said positive contact ring and a shank portion extending therefrom and said shank portion having a remote end spaced from said cap portion;
   an elongated, tubular electrically insulated spacer having an outer surface and an inner surface, said inner surface threaded to match the threads on said shank of said screw member, and said spacer threadingly engaging said shank portion of said screw, and a top end of said spacer abutting said lower surface of said circuit board and a bottom end of said spacer in regions adjacent said tip of said shank portion of said screw;
   an electrically conductive tube surrounding said outside surface of said spacer and electrically insulated from said screw by said spacer, said tube having a top end abutting said negative contact ring on said lower surface of said circuit board and a bottom end in regions adjacent said tip of said shank portion of said screw;
   an electrically conductive pin member connected to said tube and extending outwardly therefrom.

2. The arrangement defined in claim 1 wherein:
   said spacer is fabricated from nylon;
   said tube is fabricated from aluminum; and
   said pin is fabricated from steel.

3. The arrangement defined in claim 1 wherein:
   said spacer extends from said circuit board a first preselected distance toward said tip of said shank portion of said screw; and,
   said tube extends from said circuit board a second preselected distance toward said tip of said shank portion of said screw.

4. The arrangement defined in claim 3 wherein:
   said first preselected distance is greater than said second preselected distance.

5. The arrangement defined in claim 1 wherein:
   said pin member extends partially through said spacer and said pin member is free of contact with said shank portion of said screw.

6. A bayonet type LED mounting arrangement for an insect trap, comprising, in combination:
   a circuit board having an upper surface, a lower surface and a peripheral edge, said circuit board having walls defining an aperture therethrough in regions adjacent the center portion of the circuit board;
   a positive circuit on said upper surface of said circuit board and a negative circuit on said lower surface of said circuit board, said positive circuit having a positive contact ring in regions adjacent said aperture, said negative circuit having a negative contact ring in regions spaced from said aperture;

at least one LED light source on said circuit board in regions adjacent said peripheral edge thereof, and said at least one LED light source electrically connected to said positive circuit and said negative circuit;

an electrically conductive threaded screw member extending through said aperture in said circuit board and having a cap portion contacting said positive contact ring and a shank portion extending therefrom and said shank portion having a remote end spaced from said cap portion;

an elongated, tubular electrically insulated spacer having an outer surface and an inner surface, said inner surface threaded to match the threads on said shank of said screw member, and said spacer threadingly engaging said shank portion of said screw, and a top end of said spacer abutting said lower surface of said circuit board and a bottom end of said spacer in regions adjacent said tip of said shank portion of said screw;

an electrically conductive tube surrounding said outside surface of said spacer and electrically insulated from said screw by said spacer, said tube having a top end abutting said negative contact ring on said lower surface of said circuit board and a bottom end in regions adjacent said tip of said shank portion of said screw;

an electrically conductive pin member extending connected to said tube and extending outwardly therefrom;

a bayonet socket having an outer electrically conductive, tubular outer casing and said outer casing having pin accepting slots therein for accepting said pin member and in electrical contact therewith for the condition of said pin member inserted therein, and said socket having a center pin and said tip of said shank portion of said screw in electrically conductive contact with said center pin for the condition of said screw member, said spacer and said tube inserted into said casing of said socket, and said casing comprising the negative contact for said socket and said center pin comprising the positive contact for said socket;

a battery for supplying electrical power operatively connected to said socket.

7. The arrangement defined in claim 6 and further comprising:
a switch mounted between said battery and having an "ON" position for allowing electrical power to flow from said battery to said socket and an "OFF" condition for preventing the flow of electrical power to said socket.

8. The arrangement defined in claim 7 wherein:
said switch is manually operable between said "ON" condition thereof and said "OFF" condition thereof.

9. The arrangement defined in claim 7 wherein:
said switch is automatically operable between said "ON" condition thereof and said "OFF" condition thereof;
and further comprising a light sensor for receiving ambient light operatively connected to said switch for automatically turning said switch to said "ON" condition for ambient light incident upon said light sensor less than a preselected intensity level and automatically turning said switch to said "OFF" condition for ambient light incident upon said light sensor greater than a preselected intensity level.

10. The arrangement defined in claim 7 and further comprising:
a solar cell operatively connected to said battery for charging said battery.

11. The arrangement defined in claim 9 and further comprising:
a solar cell operatively connected to said battery for charging said battery.

12. The arrangement defined in claim 1 and further comprising:
a plurality of LED light sources connected to said circuit board in regions adjacent said peripheral edge thereof, and each of said plurality of LED light sources operatively connected to said positive circuit and said negative circuit.

13. The arrangement defined in claim 7 and further comprising:
a plurality of LED light sources connected to said circuit board in regions adjacent said peripheral edge thereof, and each of said plurality of LED light sources operatively connected to said positive circuit and said negative circuit.

14. The arrangement defined in claim 13 wherein:
said spacer is fabricated from nylon;
said tube is fabricated from aluminum; and
said pin is fabricated from steel.

15. The arrangement defined in claim 14 and further comprising:
said first preselected distance is greater than said second preselected distance.

16. The arrangement defined in claim 15 wherein:
said spacer extends from said circuit board a first preselected distance toward said tip of said shank portion of said screw; and,
said tube extends from said circuit board a second preselected distance toward said tip of said shank portion of said screw.

* * * * *